(12) United States Patent
Lee et al.

(10) Patent No.: US 11,161,497 B2
(45) Date of Patent: Nov. 2, 2021

(54) HYBRID VEHICLE AND METHOD OF CONTROLLING MODE TRANSITION

(71) Applicants: HYUNDAI MOTOR COMPANY, Seoul (KR); KIA MOTORS CORPORATION, Seoul (KR)

(72) Inventors: Jea Mun Lee, Seoul (KR); Joon Young Park, Seoul (KR); Ji Hoon Kang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 446 days.

(21) Appl. No.: 15/802,626

(22) Filed: Nov. 3, 2017

(65) Prior Publication Data
US 2018/0170357 A1    Jun. 21, 2018

(30) Foreign Application Priority Data

Dec. 16, 2016    (KR) .......................... 10-2016-0172825

(51) Int. Cl.
*B60W 20/20*    (2016.01)
*B60W 20/30*    (2016.01)
(Continued)

(52) U.S. Cl.
CPC ............... *B60W 20/20* (2013.01); *B60K 6/48* (2013.01); *B60W 10/02* (2013.01); *B60W 10/06* (2013.01);
(Continued)

(58) Field of Classification Search
CPC ........... B60W 20/20; B60W 2710/021; B60W 2600/00; B60W 2540/00; B60W 2520/105; B60W 2510/0208; B60W 2400/00; B60W 2030/203; B60W 50/082; B60W 30/20; B60W 20/30; B60W 10/02; Y02T 90/14; Y02T 10/6221; B60K 6/48
See application file for complete search history.

(56) References Cited

U.S. PATENT DOCUMENTS

| 2015/0006001 A1* | 1/2015 | Kawata ..................... B60L 7/14 701/22 |
| 2015/0197162 A1* | 7/2015 | Martin ................... B60K 35/00 701/22 |
| 2016/0046281 A1* | 2/2016 | Nedorezov ......... F02N 11/0851 701/22 |

FOREIGN PATENT DOCUMENTS

| JP | 2008-507442 A | 3/2008 |
| JP | 2012-240566 A | 12/2012 |

(Continued)

*Primary Examiner* — Mathew Franklin Gordon
(74) *Attorney, Agent, or Firm* — Brinks Gilson & Lione (57) ABSTRACT

Disclosed are a method of controlling a mode transition in order to predict a driver's required torque to reduce non-driving fuel loss, and a hybrid vehicle for performing the method in particular, the method of controlling a mode transition of a hybrid vehicle may include: determining whether to change a first mode to a second mode based on a first torque; determining a second torque expected to be generated at a near-future time after a current time; determining whether or not an engine clutch engagement is possible at the near-future time based on the second torque or a predicted acceleration; and performing the change from the first mode to the second mode when the mode change from the first mode to the second mode is determined and the engine clutch engagement is possible.

17 Claims, 10 Drawing Sheets

(51) Int. Cl.
  *B60W 20/40* (2016.01)
  *B60W 20/50* (2016.01)
  *B60W 30/20* (2006.01)
  *B60W 10/08* (2006.01)
  *B60W 50/08* (2020.01)
  *B60W 10/02* (2006.01)
  *B60K 6/48* (2007.10)
  *B60W 10/06* (2006.01)

(52) U.S. Cl.
  CPC ............ *B60W 10/08* (2013.01); *B60W 20/30* (2013.01); *B60W 20/40* (2013.01); *B60W 20/50* (2013.01); *B60W 30/20* (2013.01); *B60W 50/082* (2013.01); *B60W 2030/203* (2013.01); *B60W 2030/206* (2013.01); *B60W 2400/00* (2013.01); *B60W 2510/0208* (2013.01); *B60W 2520/105* (2013.01); *B60W 2540/00* (2013.01); *B60W 2540/10* (2013.01); *B60W 2540/12* (2013.01); *B60W 2540/14* (2013.01); *B60W 2556/00* (2020.02); *B60W 2710/021* (2013.01); *B60W 2710/027* (2013.01); *Y02T 10/62* (2013.01); *Y02T 90/14* (2013.01)

(56) References Cited

FOREIGN PATENT DOCUMENTS

| | | |
|---|---|---|
| JP | 2016-055761 A | 4/2016 |
| KR | 10-0792892 B1 | 1/2008 |
| KR | 10-2015-0020077 | 2/2015 |

\* cited by examiner

HYBRID VEHICLE AND METHOD OF CONTROLLING MODE TRANSITION

CROSS-REFERENCE TO RELATED APPLICATION

This application claims priority to and the benefit of Korean Patent Application No. 10-2016-0172825, filed on Dec. 16, 2016, which is incorporated herein by reference in its entirety.

FIELD

The present disclosure relates to a hybrid vehicle and method of controlling a mode transition to reduce fuel loss.

BACKGROUND

The statements in this section merely provide background information related to the present disclosure and may not constitute prior art.

The demand for eco-friendly vehicles is increasing due to the constant demand for fuel efficiency improvement for vehicles and the strengthening of exhaust gas regulations in many countries. As a practical alternative to this, a hybrid electric vehicle/plug-in hybrid electric vehicle (HEV/PHEV) is provided.

Such a hybrid vehicle can provide optimal output and torque depending on how well the engine and motor are operated in harmony in the course of driving with the two power sources. Particularly, in a hybrid vehicle adopting a parallel type hybrid system in which an electric motor and an engine clutch (EC) are mounted between the engine and the transmission, the output of the engine and the motor can be simultaneously transmitted to a drive shaft.

Generally, in a hybrid vehicle, electric energy is used during initial acceleration (i.e., EV mode). However, since electric energy alone has a limitation in meeting the driver's required power, use of the engine as the main power source is eventually required (i.e., the HEV mode). In such a case, in the hybrid vehicle, when the difference between the number of revolutions of the motor and the number of revolutions of the engine is within a predetermined range, the engine clutch is engaged so that the motor and the engine rotate together. At this time, when the number of revolutions is too low, engine stall may occur when the engine clutch is engaged. Therefore, the hybrid vehicle controls the number of revolutions of the engine and the motor such that the engine clutch starts to be engaged at a specific revolution number (hereinafter, referred to as "target engagement speed" for convenience) set in a relatively safe zone in the stall of the engine. The target engagement speed can be set differently according to the engine characteristics of the vehicle or the gear stage at the engagement time.

However, we have discovered that when the engine is started immediately after it is needed as a main power source, a delay often occurs until the engine clutch is actually engaged and the force of the engine is transmitted to the axle of the drive wheel. As a result, fuel loss occurs while the power of the engine does not contribute to driving, which is called "non-driving fuel loss". The manner in which a non-driving fuel loss occurs will be described with reference to FIG. 1.

Figure 1:
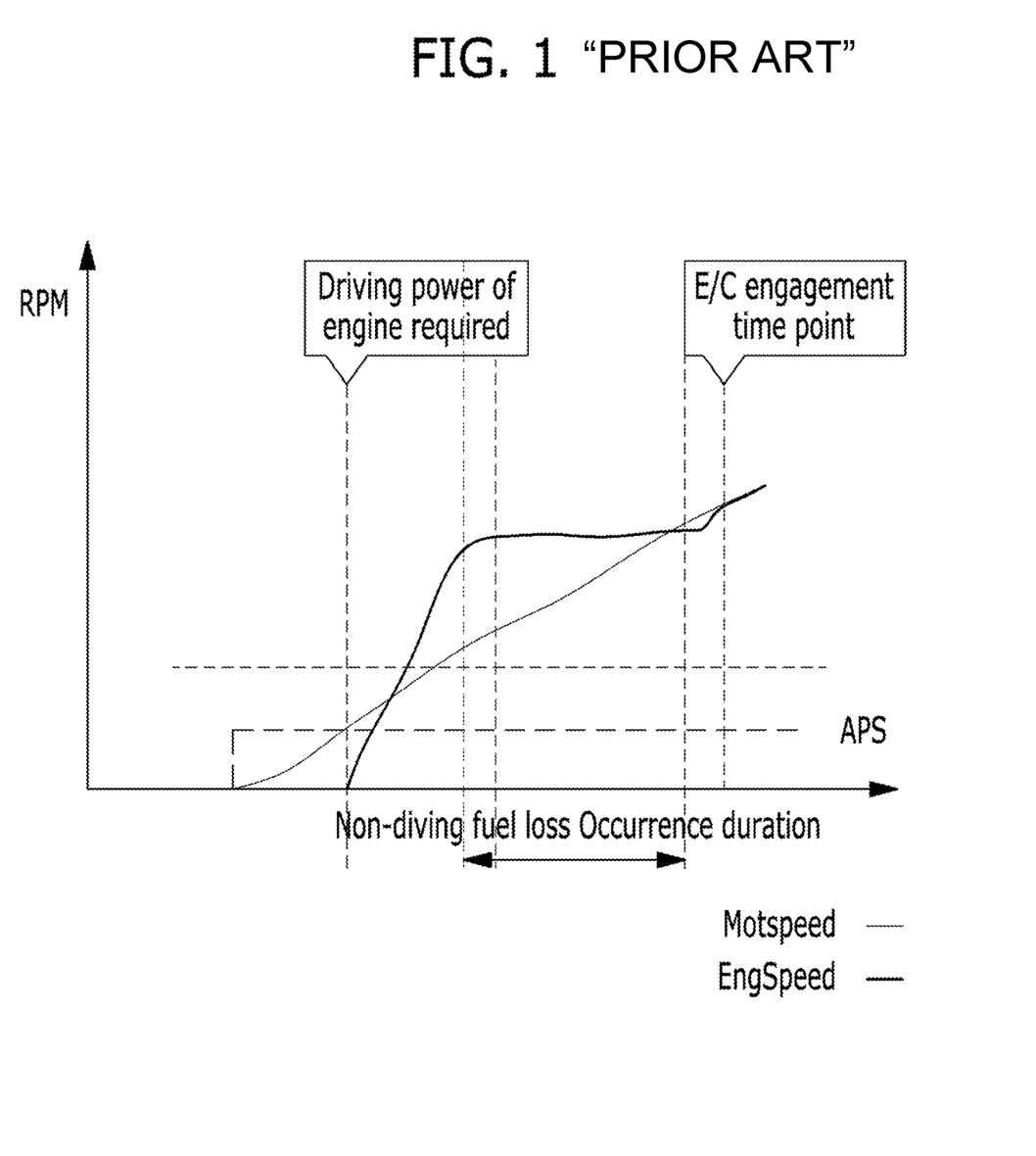
FIG. 1 is a view for explaining an example of a form in which a non-driving fuel loss occurs in a general hybrid vehicle.

FIG. 1 is a view for explaining an example of a form in which a non-driving fuel loss occurs in a general hybrid vehicle.

Referring to FIG. 1, when a driver operates the accelerator pedal (i.e., APS on), the required torque becomes large, and when it is determined by the vehicle that the driving power of the engine is required, the engine is started.

Since the engine is not loaded at the time of engine start-up, engine Speed (EngSpeed) rises rapidly but the motor speed ("MotSpeed") may not reach the target engagement speed. In this case, the engine remains idle at the target engagement speed up to the engagement time, during which time a non-driving fuel loss occurs.

SUMMARY

The present disclosure is directed to a hybrid vehicle and method of controlling a mode transition that substantially obviate one or more problems due to limitations and disadvantages of the related art.

The present disclosure provides a method of efficiently controlling a mode transition in a hybrid vehicle and a vehicle for performing the same.

Particularly, the present disclosure provides a mode transition control method capable of reducing non-driving fuel loss due to a gear shift in a parallel type hybrid vehicle, and a vehicle for performing the same.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

The present disclosure provides a method of controlling a mode transition of a hybrid vehicle, and the method may include: determining, by a hybrid control unit, whether to change a first mode to a second mode based on a first torque, the first torque being a current required torque; determining, by a hybrid control unit, a second torque to be generated at a near-future time; determining, by a hybrid control unit, whether or not an engine clutch engagement is possible at the near-future time based on the second torque, or determining the predicted acceleration; and performing, by a hybrid control unit, the change from the first mode to the second mode when the change from the first mode to the second mode is determined and the engine clutch engagement is possible.

In another aspect of the present disclosure, a hybrid vehicle may include: a driving information detection unit configured to interoperate with various sensors of the hybrid vehicle and to detect driving information of the hybrid vehicle; a driver acceleration/deceleration prediction unit configured to generate a predicted value of a near-future acceleration/deceleration intention of a driver reflecting a driving environment of the hybrid vehicle, based on information transmitted from the driving information detection unit by utilizing an acceleration/deceleration prediction model, and a hybrid control unit configured to determine a first torque and determine a second torque based on the predicted value of the near-future acceleration/deceleration intention, the first torque being a current required torque and the second torque being a required torque expected to be generated at a near-future time after a current time. Here, the hybrid control unit may be further configured to determine whether to change a first mode to a second mode based on the first torque, to determine whether or not an engine clutch engagement is possible at the near-future time based on the second torque or the predicted acceleration, and to perform the change from the first mode to the second mode when the change from the first mode to the second mode is determined and the engine clutch engagement is possible.

It is to be understood that both the foregoing general description and the following detailed description of the present disclosure are exemplary and explanatory and are intended to provide further explanation of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may, however, be embodied in many different forms and should not be construed as limited to the forms set forth herein. In order to clearly illustrate the present disclosure in the drawings, parts not related to the description are omitted.

Throughout the present disclosure, when a part is referred to as "including" an element, it means that the part may include other elements as well, unless specifically stated otherwise. In addition, parts denoted by the same reference numerals throughout the present disclosure denote the same components.

Also, the terms, such as 'unit' or 'module', etc., should be understood as a unit that processes at least one function or operation and that may be embodied in a hardware manner (e.g., a processor), a software manner, or a combination of the hardware manner and the software manner.

In one form of the present disclosure, a method for determining an optimal engine start time point is proposed to reduce the non-driving fuel loss of the engine when the mode transition to the HEV mode is performed in the hybrid vehicle.

According to one form, the engine start time point can be determined by using a time at which the engine reaches the target engagement speed and the rate of increase of the current motor speed. This will be described with reference to FIG. 2.

Figure 2:
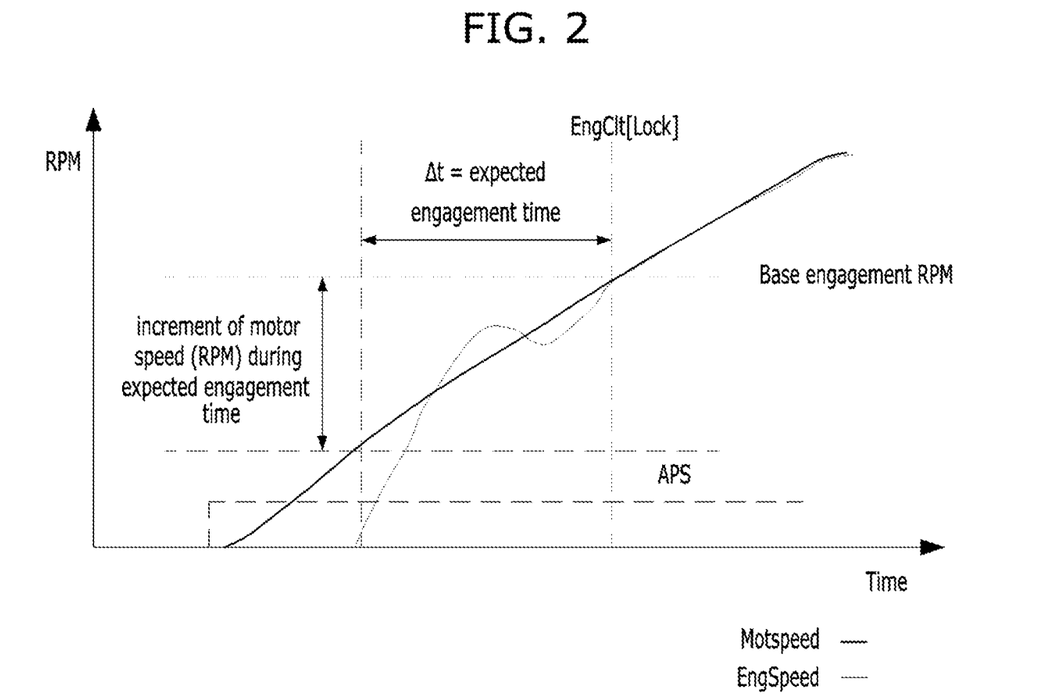
FIG. 2 is a view for explaining a basic concept of determining an engine start time in one form of the present disclosure.

FIG. 2 is a view for explaining a basic concept of determining an engine start time according to one form of the present disclosure.

In FIG. 2, it is assumed that the APS (accelerator pedal sensor) value is maintained at a constant value, and accordingly the rate of increase of the motor speed (MotSpeed) is also constant. Under this assumption, when the estimated time required from the engine start to the engagement of the engine clutch (i.e., "Cranking time" or "expected engagement time") is known, the increment of the motor speed (RPM) during the expected engagement time can also be determined. As a result, if the engine is started at the time point when the sum of current motor speed and the increment of the motor speed during the expected engagement time becomes equal to or higher than the target engagement speed, the engine clutch can be engaged immediately because the engine and the motor will reach the target engagement speed simultaneously. Therefore, the engine power can be directly utilized as the driving force, so that the non-driving fuel loss can be reduced.

In other words, the condition of the engine start time point can be expressed as follows based on the current motor speed: current motor speed>target engagement speed−total motor speed increment during the expected engagement time Here, the total motor speed increment during the expected engagement time is a value obtained by multiplying the motor speed increase rate by the expected engagement time as described above.

A mode transition (i.e., a mode change from one mode to another mode) method to which the above-described method of determining the engine start time point according to the present form is applied will be described with reference to FIG. 3. Hereinafter, the change from a first mode to another mode is referred to as a mode transition for convenience.

Figure 3:
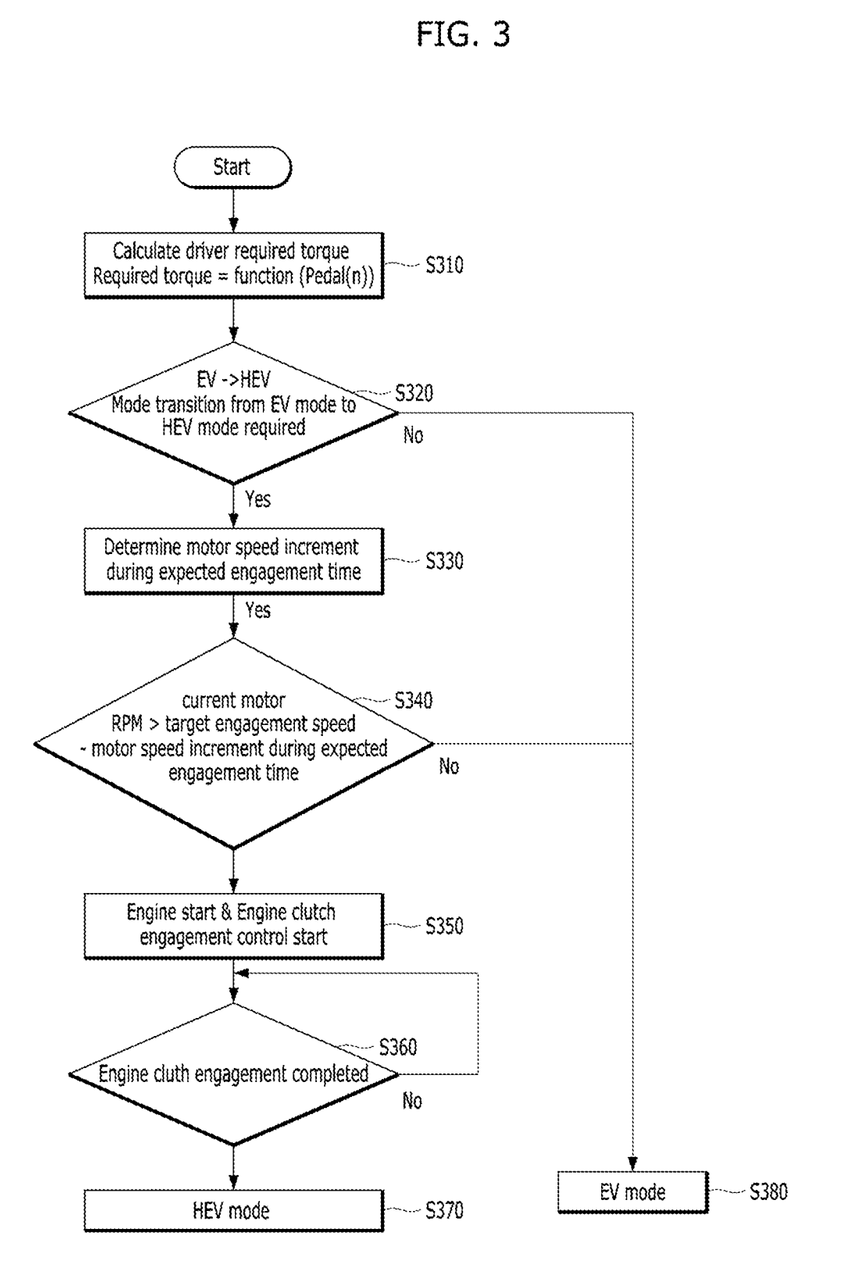
FIG. 3 is a flowchart illustrating an example of a mode transition control process according to one form of the present disclosure.

FIG. 3 is a flowchart illustrating an example of a mode transition control process according to one form of the present disclosure.

In FIG. 3, it is assumed that the determination subject in each step is a hybrid control unit, which will be described in detail later. The hybrid control unit may be implemented by at least one processor operated by a setting program, in which the setting program includes a series of commands for performing each of determination steps according to the present disclosure to be described below.

Referring to FIG. 3, the hybrid control unit first detects the accelerator position sensor (APS) change amount or the Brake Pedal Sensor (BPS) change amount through the driving information detection unit 110, and calculates the current driver required torque (S310).

Here, the current driver required torque may be obtained from a function of the pedal position Pedal(n) sensed by the current pedal sensors APS and BPS. More specifically, '(n)' has a positive (+) value when the accelerator pedal APS is operated, and a negative (−) value when the brake pedal BPS is operated.

The hybrid control unit 140 may determine whether to change the EV mode to the HEV mode (i.e., mode transition from the EV mode to the HEV mode) based on the calculated required torque (driver required torque) at S320.

If it is determined that the mode transition to the HEV mode is required, the hybrid control unit can determine motor speed increment during the expected engagement time (S330). Here, the motor speed increment during the expected engagement time may be a value obtained by multiplying the motor speed increase rate by the expected engagement time as described above. The motor speed increase rate may be calculated by obtaining the RPM information of the motor from the motor controller that controls the electric motor and the expected engagement time may be a predetermined value according to the configuration and specifications of the engine and engine clutch of the vehicle, and may be set to a plurality of values according to other variables such as the current gear stage of the transmission.

The hybrid control unit determines whether or not the condition of "current motor speed>target engagement speed−total motor speed increment during the expected engagement time" is satisfied (S340), and controls the engine to be started and engine clutch engagement control to be performed, by controlling an engine control unit and a clutch control unit, respectively (S350).

When the engine clutch engagement is completed (S360), the hybrid controller can control the mode transition to the HEV mode to be performed (S370). If it is determined in the step S320 that the mode transition to the HEV mode is not required, or if the condition in the step S340 is not satisfied, the EV mode can be maintained (S380).

Here, in the case where the process proceeds from the step S340 to the step S380, the hybrid control unit may return to step S320 or step S340 repeatedly to determine the engine start time point while the EV mode control is carried out.

Hereinafter, the technical effect of the present form will be described with reference to FIG. 4, by comparing the above-described form and the comparative example.

Figure 4:
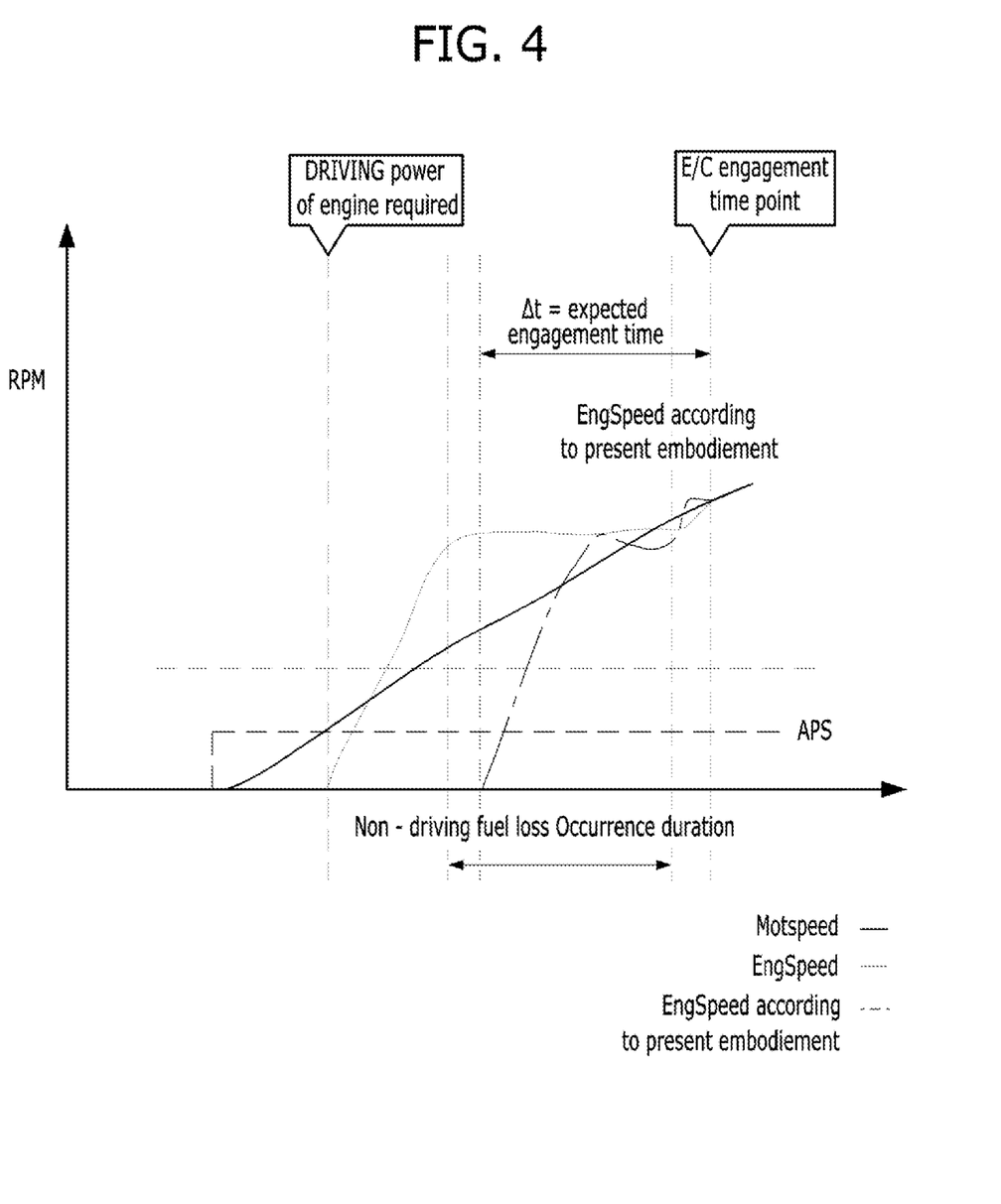
FIG. 4 is a view for explaining a difference between a mode transition method according to one form of the present disclosure and a general mode transition method.

FIG. 4 is a view for explaining a difference between a mode transition method according to one form of the present disclosure and a general mode transition method.

In FIG. 4, the motor speed (MotSpeed), the engine speed (EngSpeed) according to the general mode transition control, and the engine speed according to the present form (EngSpeed according to present form) are shown on the graph.

Referring to FIG. 4, in the general mode transition control, engine start and engine clutch engagement control are started immediately when it is determined that the driving force of the engine is required. Therefore, the non-driving fuel loss occurs until the motor reaches the target engagement speed. However, according to the form of the present disclosure, engine startup and engine clutch engagement control are started when the condition of "current motor speed>target engagement speed−total motor speed increment during the expected engagement time" is satisfied. Therefore, the non-driving fuel loss can be reduced.

However, the above-described method provides the highest efficiency when the current required torque does not fluctuate at least during the expected engagement time and the motor speed increase rate is assumed to be constant. Therefore, if there is a variation in the required torque during the expected engagement time, the predictability is lowered, and the fuel efficiency improvement effect can be reduced.

Therefore, in another form of the present disclosure, it is proposed that the required torque at a near-future time and the motor speed at the near-future time based on the required torque are predicted by using a near-future prediction model to improve the prediction accuracy.

First, a hybrid vehicle structure to which forms of the present disclosure may be applied will be described with reference to FIG. 5.

Figure 5:
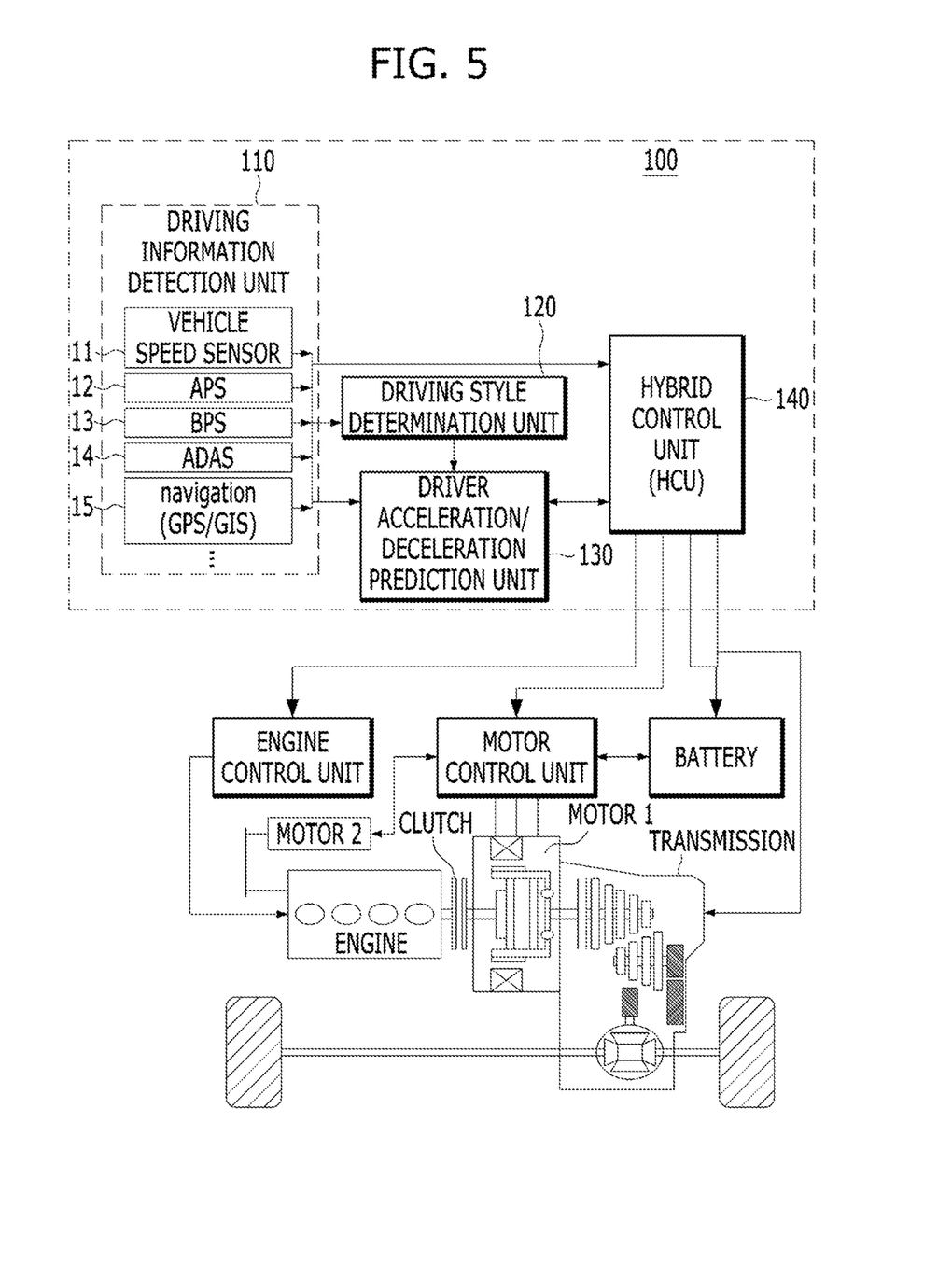
FIG. 5 is a block diagram schematically illustrating a control system of a hybrid vehicle in one form of the present disclosure.

FIG. 5 is a block diagram schematically illustrating a control system of a hybrid vehicle according to one form of the present disclosure.

Referring to FIG. 5, the control system 100 of a hybrid vehicle includes: a driving information detection unit 110, a driving style determination unit 120, a driver acceleration/deceleration prediction unit 130, and a hybrid control unit 140. This configuration is merely illustrative, and the transmission control system may be configured to include fewer elements (e.g., omitting the driving style determination unit) or more elements.

The driving information detection unit 110 detects drive information according to driving of the vehicle in operative connection with at least one of a vehicle speed sensor 11, an accelerator position sensor (APS) 12, a brake pedal sensor (BPS) 13, an advanced driver assistance system (ADAS) 14, and a navigation unit 15.

The driving information detection unit 110 detects the driver's accelerator operation status through the APS 12 and detects the brake operation status through the BPS 13.

The driving information detection unit 110 detects the vehicle speed through the vehicle speed sensor 11 and detects front behavior information including the relative distance and acceleration with respect to a proceeding vehicle through a radar sensor, a (stereo) camera, or the like of the ADAS 14. Of course, besides the radar and camera, various sensors such as an ultrasonic sensor and laser may be utilized depending on the configuration of the ADAS.

The driving information detection unit 110 detects navigation information (road environment information) such as GPS/GIS-based location information about the vehicle, road type, congestion degree, speed limit, intersection, tollgate, turn and gradient information. To provide this information, the navigation unit 15 may reference a built-in navigation map and traffic information collected through external wireless communication (e.g., telematics, TPEG, etc.).

The driving style determination unit 120 determines the driver's driving style based on a drive pattern such as an average velocity, an APS change amount (dAPS), and a BPS change amount (dBPS) according to the driver's manipulation of the vehicle.

For example, the driving style determination unit 120 may configure a fuzzy membership function using measurement factors such as the APS change amount, the BPS change amount, the vehicle speed, the gradient, and the like detected by the driving information detection unit 110 as input parameters, and calculates a short-term driving style index (SI=0 to 100%).

The driving style determination unit 120 may determine the driving style of the driver at a plurality of levels by dividing the calculated short-term driving style index (SI=0 to 100%) based on a predetermined reference ratio according to the driving style intensity.

The driver acceleration/deceleration prediction unit 130 learns an acceleration/deceleration prediction model according to the driving style by utilizing machine learning scheme and yields a predicted value of the driver's near-future acceleration/deceleration intention reflecting the driving environment of the vehicle and the driving style by utilizing the acceleration/deceleration prediction model. That is, the driver acceleration/deceleration prediction unit 130 may use the vehicle speed, the radar information, the navigation information, and the driving style of the driver detected through the driving information detection unit 110 as input information to quantitatively digitize the type of driving manipulation that occurs in units of relatively short time. Thereby, the driver acceleration/deceleration prediction unit 130 may determine the driver's momentary intention of acceleration/deceleration and generate a predicted value of near-future acceleration/deceleration of the driver. The predicted acceleration/deceleration value may be configured with a strength and probability of stepping on an accelerator or a brake pedal in a predetermined time unit in the near future.

A specific prediction algorithm of the acceleration/deceleration prediction unit 130 may include a neural network that complements a pre-constructed prediction model using a machine learning technique, which will be described later in more detail.

The hybrid control unit 140 controls the operation of each part for drive mode switching of the hybrid vehicle according to one form of the present disclosure, and that integrally controls, as the highest control unit, the engine control unit and the motor control unit connected over a network.

The hybrid control unit 140 may analyze the driver's current required torque detected by the driving information detection unit 110 through the APS or BPS and transmit the analyzed torque to the TCU. In addition, the hybrid control unit may predict a required torque at a specific time in the near future based on the received predicted near-future acceleration/deceleration value and, and transmit the predicted torque to the TCU.

The TCU may acquire information on the current required torque and the predicted near-future required torque value from the hybrid control unit 140 to determine whether or not to perform gear-shift and transmit a gear-shift command corresponding to the determination result to the transmission.

In some forms, if the acceleration/deceleration prediction unit 130 predicts even the near-future required torque using the predicted near-future acceleration/deceleration value, the acceleration/deceleration prediction unit 130 may directly transmit the value of the near-future required torque to the TCU.

Alternatively, the TCU may determine whether or not to perform gear-shift according to the current required torque, and the hybrid control unit 140 may determine whether or not to perform gear-shift based on the predicted value of the near-future required torque. The result of the determination performed by the hybrid control unit 140 may be transmitted to the TCU so as to override the gear-shift determination of the TCU.

In this form, the driving style determination unit may be omitted depending on the configuration. In this case, the driver acceleration/deceleration prediction unit 130 may perform acceleration/deceleration prediction, excluding an input value related to the driving style.

Hereinafter, a method for the driver acceleration/deceleration prediction unit 130 to predict the driver's acceleration/deceleration intention will be described with reference to FIGS. 6A and 6B.

Figure 6A:
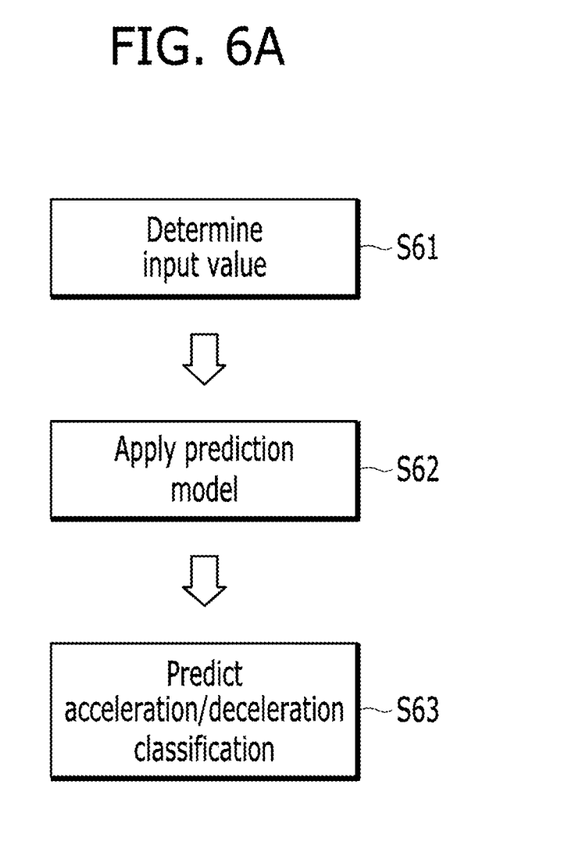
FIGS. 6A and 6B illustrate an exemplary process of predicting a driver's intention of acceleration/deceleration that may be applied to forms of the present disclosure.
Figure 6B:
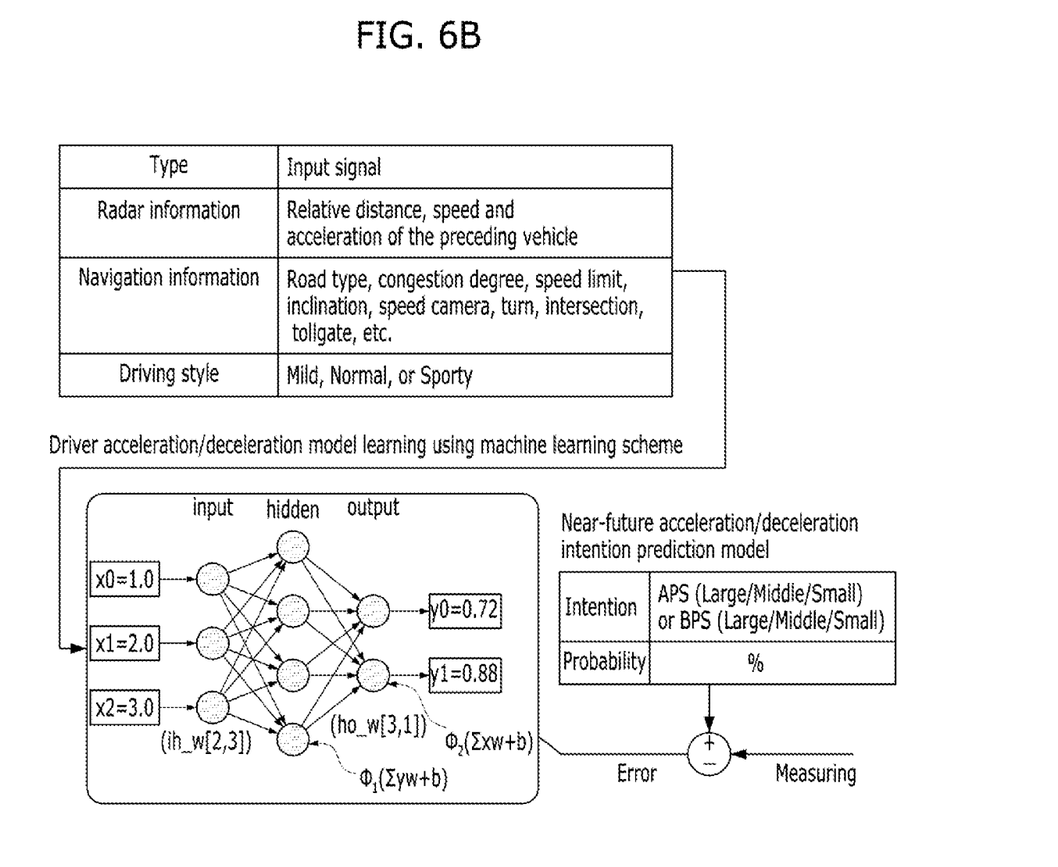

FIGS. 6A and 6B illustrate an exemplary process of predicting a driver's intention of acceleration/deceleration that may be applied to forms of the present disclosure.

Referring to FIG. 4A, the process of the driver acceleration/deceleration prediction unit 130 predicting the driver's acceleration/deceleration intention may be divided into three steps. Specifically, parameters to be used as input values for prediction may be determined first (S61). The prediction model may be modified through machine learning scheme (S62), and the acceleration and deceleration may be classified through the determined input value and the modified model to calculate a predicted value for a near-future situation (S63).

Here, determining the input value (S61) may include: 1) extracting candidates of the input value; 2) pre-processing input signals by integrating the input signals; and 3) selecting a final parameter using the pre-processed candidate values. As machine learning scheme, a time series model-based technique or a deep learning-based technique may be used. Examples of the time series model-based technique may include the autoregressive integrated moving average (ARIMA) technique, which describes changes in behavior over time with a stochastic indicator, and the multi-layer perceptron (MLP) technique, which uses nonparametric regression as a universal approximator. Examples of the deep learning-based technique may include the Stacked Auto Encoder (SAE) technique, which makes input/output data similar through dimension reduction, the Recurrent Neural Networks (RNNs) technique, which is a neural network algorithm to process sequential information, and the Long Short Term Memory (LSTM) technique suitable for long-term dependency learning. An example of the driver acceleration/deceleration prediction unit predicting the driver's near-future acceleration/deceleration intention using the neural network algorithm is shown in FIG. 6B.

Referring to FIG. 6B, the driver acceleration/deceleration prediction unit 130 according to one form of the present disclosure includes a neural network that learns an acceleration/deceleration prediction model for each driving style of the driver using a machine learning technique.

In one form, the driver acceleration/deceleration prediction unit 130 has a near-future acceleration/deceleration prediction model for each driving style pre-constructed based on big data which has been accumulated through test driving by utilizing the neural network before shipment of the vehicle.

Further, the driver acceleration/deceleration prediction unit 130 may reflect, in the near-future acceleration/deceleration prediction model for each driving style constructed using the neural network, the vehicle behavior data learned through actual driving of the vehicle after shipment of the vehicle, thereby generating a near-future acceleration/deceleration prediction model for each driving style personalized for the driver. At this time, the driver acceleration/deceleration prediction unit 130 may apply the learned behavior data to the near-future acceleration/deceleration prediction model of the corresponding driving style according to determination of the driver's driving style (mild, general, sporty, etc.).

The driver acceleration/deceleration prediction unit 130 may calculate a predicted value of the near-future acceleration/deceleration intention according to the driving style of the driver, using the driving environment that includes the vehicle speed, the radar information and the navigation information and the driving style of the driver as input information. Here, the driving style may be classified into a plurality of style types as shown in FIG. 6B, and may be configured by numerical values such as an average speed, an accelerator pedal change rate (dAPS), and a brake pedal change rate (dBPS)

In addition, the driver acceleration/deceleration prediction unit 130 may perform model modification according to the driver acceleration/deceleration model learning through machine learning scheme in real time while being mounted on the vehicle, or may receive a modified model from the outside and use the same for the prediction operation without learning.

In other words, when the model is allowed to be modified from the outside, the parameters serving as input values of learning may be transmitted to a telematics center or a cloud server, such that model modification through learning is performed from the outside and only a final model is transmitted to the vehicle.

Figure 7:
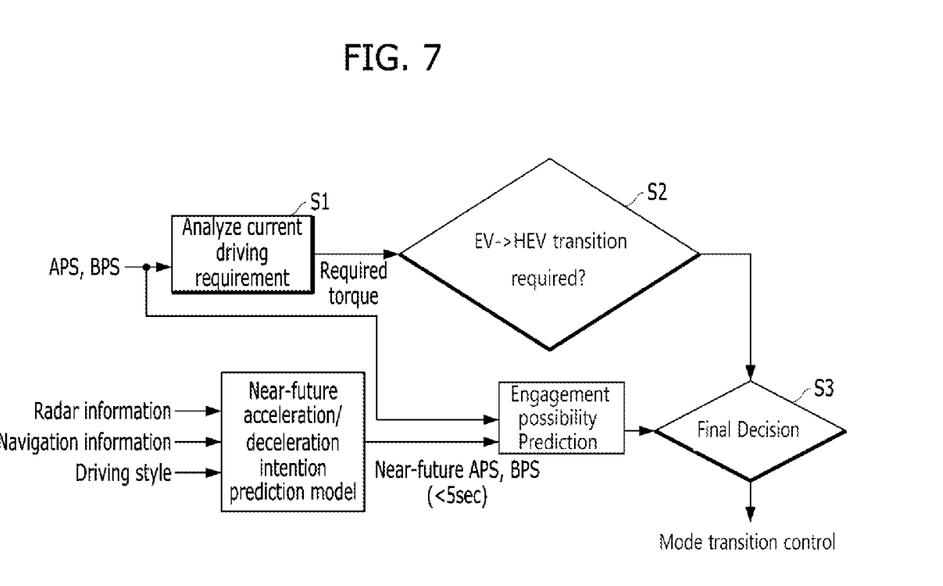
FIG. 7 illustrates a mode transition method using a near-future acceleration/deceleration prediction model according to another form of the present disclosure.

FIG. 7 illustrates a mode transition method using a near-future acceleration/deceleration prediction model according to one form of the present disclosure.

Referring to FIG. 7, the hybrid control unit 140 analyzes current operation requirements according to the driver's manipulation of the APS or BPS, and calculates a required torque (S1). The hybrid control unit 140 determines whether to perform a mode transition from EV mode to HEV mode based on the current required torque (S2).

Meanwhile, the driver acceleration/deceleration prediction unit 130 outputs the driver's acceleration/deceleration intention prediction information using the near-future acceleration/deceleration prediction model, and then the hybrid control unit 140 determines whether the engine clutch engagement is possible or not in the near-future (S3). The determination of whether or not the engagement is possible will be described later in more detail with reference to FIG. 8.

By combining the respective determination result of the steps of S2 and S3, the hybrid control unit 140 may determine whether to finally perform a mode transition or not.

Here, the predicted required torque value may be calculated by the driver acceleration/deceleration prediction unit 130 or may be calculated by the hybrid control unit 140. Although not shown in figure, the predicted required torque value may be calculated by a separate control unit for generating the predicted required torque value.

The mode transition method for the hybrid vehicle according to one form of the present disclosure will be described in more detail with reference to FIG. 8, focusing on the control system 100 of the hybrid vehicle described above.

Figure 8:
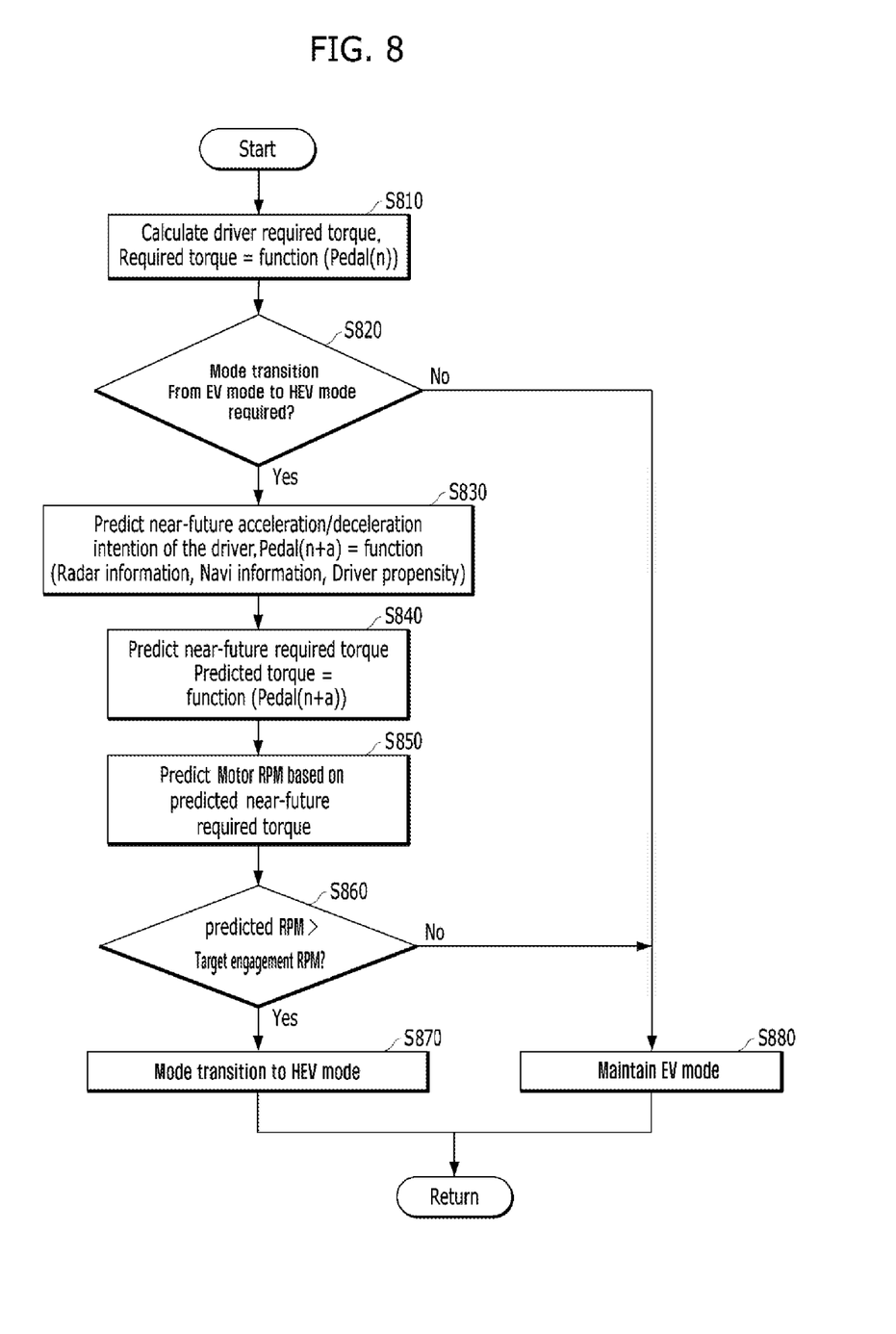
FIG. 8 is a flowchart illustrating a method of controlling a mode transition of a hybrid vehicle according to another form of the present disclosure.

FIG. 8 is a flowchart illustrating a method of controlling a mode transition of a hybrid vehicle.

Referring to FIG. 8, the hybrid control unit first detects the APS change amount or the BPS change amount through the driving information detection unit 110, and calculates the current driver required torque (S810).

Here, the required torque may be obtained from a function of the pedal position Pedal(n) sensed by the current pedal sensors APS and BPS. More specifically, '(n)' has a positive (+) value when the accelerator pedal APS is operated, and a negative (−) value when the brake pedal BPS is operated.

If the APS and the BPS are simultaneously detected due to the driver's faulty manipulation, the hybrid control unit may apply the brake override function to ignore the APS change and calculate the required torque only based on the BPS change.

The hybrid control unit 140 may determine whether a mode transition from the EV mode to the HEV mode is required based on the calculated required torque (S820).

The driver acceleration/deceleration prediction unit 130 generates a predicted value of the near-future acceleration/deceleration intention of the driver using the vehicle speed, the radar information, the navigation information, and the driving style of the driver as input information, when it is determined that the mode transition to the HEV mode is required (S830).

Here, Pedal(n+a) means the position of the acceleration/brake pedal after 'a' seconds. The value of 'a' may be less than 5 seconds, but forms of the present disclosure are not limited thereto. In addition, the predicted value of the near-future acceleration/deceleration intention may mean the driver's acceleration intention (APS increase or BPS decrease) or deceleration intention (APS decrease or BPS increase) predicted after a predetermined time in the near future, and the amount of change thereof or the pedal position. Of course, the information on the acceleration/deceleration intention, the amount of change, the position of the pedal, and the like may be included together with the probability information thereof.

Using the predicted value of the acceleration/deceleration intention (Pedal(n+a)) of the driver acceleration/deceleration prediction unit 130, the hybrid control unit 140 may predict the near-future required torque and/or the near-future acceleration(S840).

In addition, the hybrid control unit 140 may predict the motor speed at the near-future time by reflecting the predicted near-future required torque (S650).

Here, the predicted motor speed (RPM) can be obtained through the function of the vehicle load (i.e., function (predicted required torque, vehicle load)) in the near-future. It can also be obtained as the sum of the current motor speed and the speed increment during the engagement time.

Accordingly, the hybrid controller 140 can determine whether or not the engine clutch can be engaged at a near-future time (S860). More specifically, the hybrid controller 140 compares the predicted motor speed with the target engagement speed, and performs the mode transition to the HEV mode (S870) when the predicted motor speed is faster (i.e., engine clutch engagement is possible). Otherwise, the EV mode can be maintained until the engine clutch engagement is possible (S880).

Here, the target engagement speed may be a specific value or a certain range, and in the case of the range, and the minimum value and the predicted motor speed may be compared with each other. Further, the target engagement speed may vary according to the motor speed at which the engine clutch is actually engaged.

When the mode transition to the HEV mode is performed, the time point at which the engine is started can be determined as the time point at which the engine speed can be optimally close to the target engagement speed according to the predicted motor RPM and the predicted required torque in the hydride controller.

For example, the engine may be started at a time point earlier by time required from the engine start to the engagement of the engine clutch (i.e., expected engagement time) than the time point at which the predicted motor speed exceeds the target engagement speed.

Hereinafter, the effect of the above-described form a will be described by comparing the form and a comparative example with reference to FIG. 9.

Figure 9:
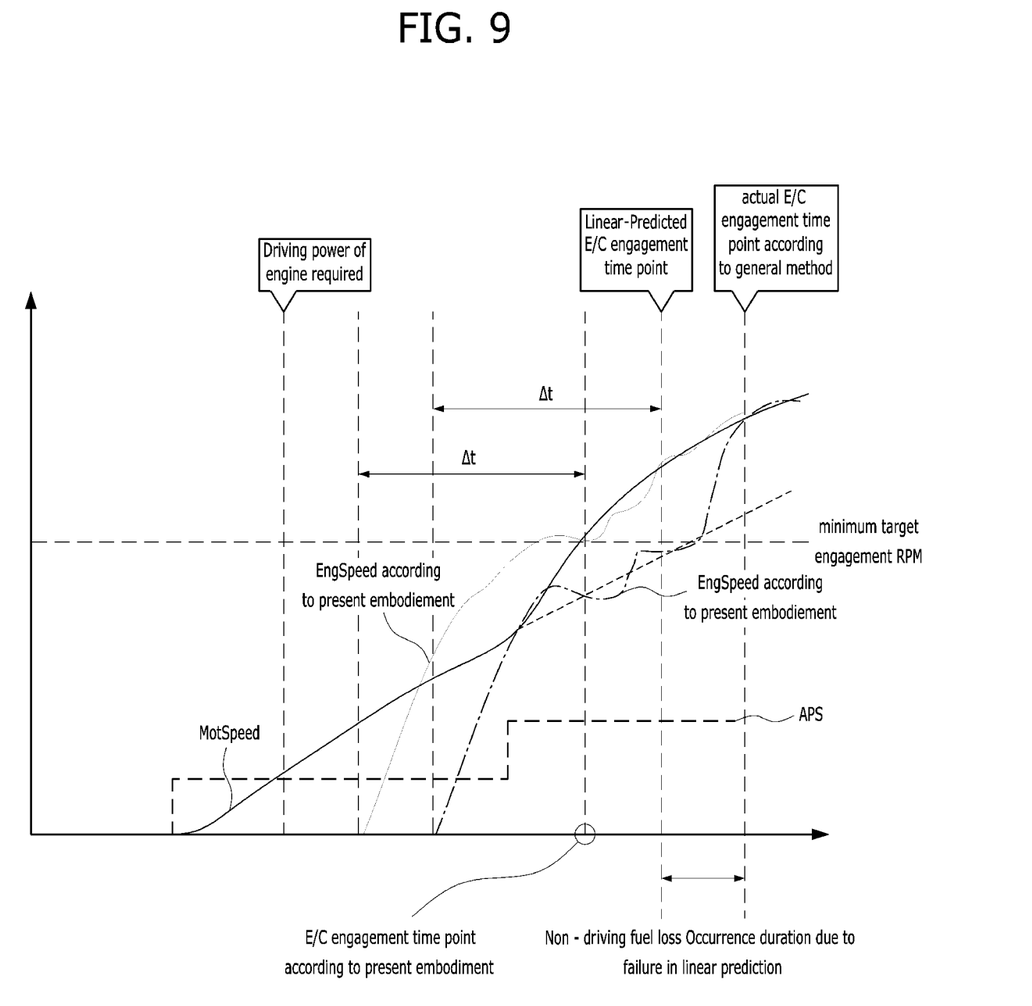
FIG. 9 is a diagram for explaining a difference between a mode transition method according to another form of the present disclosure and a general mode transition method.

FIG. 9 is a diagram for explaining a difference between a mode transition method according to another form of the present disclosure and a general mode transition method.

In FIG. 9, it is assumed that the actual motor speed (MotSpeed) is higher than the motor speed according to the linear prediction at the predicted engagement time point, due to the driver's Accelerator Pedal manipulation. The time point of "driving power of engine required" can be determined as a time point that satisfies the formula of "current motor RPM>target engagement speed−motor speed increment during the time required for engagement". Here, the time required for engagement of the engine clutch can be determined according to the mechanical characteristics of the engine clutch and the control setting of the clutch controller. Also, the motor speed increment during the engagement time can be determined as "motor speed increasing rate*time required for engagement" when the motor speed is assumed to rise constantly.

However, since the calculation of the motor speed increment above can be applied only when assuming that the motor speed is constantly raised (for example, fixed APS value), the accuracy is degraded when the actual motor speed changes before the engine clutch engagement as shown in FIG. 9. Consequently, if the APS value changes before the predicted engagement time point, the target engagement speed is changed due to the change in the motor speed. Accordingly, the engine that was started first causes loss of non-driving fuel during a time duration between the predicted engagement time point and the actual engagement time point.

In contrast, when the near-future motor speed prediction according to the present form described above is performed, the near-future motor speed can be predicted based on the predicted near-future required torque. Thus, the hybrid control unit can determine the engine start time point so that the engine speed can reach the motor speed at that point when the actual motor speed exceeds the minimum target engagement speed. Here, since the actual speed of the motor reaches the minimum target engagement speed at a point earlier than the case of the linear prediction, the starting point of the engine is faster than that of the linear prediction, and the engine clutch engagement can be performed near the minimum target engagement speed.

In the above-described forms, the driver's acceleration/deceleration intention prediction model has been described as being constructed and modified through machine learning scheme of the driver's future intention corresponding to the current driving condition based on the data accumulated during actual driving of the vehicle. However, instead of using such prediction model, the predicted value of the near-future acceleration/deceleration intention may be determined by pre-establishing a rule. An example of such rule is shown in Table 1 below.

TABLE 1

| Input signal | Analysis of driving situation | Expected result |
| --- | --- | --- |
| [Navi/Telematics]<br>Road type = Highway<br>Congestion information = Smooth<br>Front event = none<br>[Radar]<br>Front vehicle distance = Close<br>Front vehicle relative velocity = −10 kph<br>[Driving style/history]<br>Constant speed driving for the past 5 minutes<br>[Lane departure prevention system]<br>Maintain the current lane | Constant speed driving<br>Intermittent braking for maintaining the distance from the preceding vehicle | APS = 0,<br>BPS = Small |
| [Navi/Telematics]<br>Road type = Highway<br>Congestion information = Smooth<br>Front event = Tollgate/200 m<br>[Radar]<br>Front vehicle distance = none<br>Front vehicle relative speed = N/A<br>[Driving style/history]<br>Past toll pass average vehicle speed = 50 kph<br>[Lane departure prevention system]<br>Maintain the current lane | Highway driving<br>To go through the tollgate, decrease current speed to 50 kph | APS = 0,<br>BPS = Middle |

Further, although the future required torque has been described above as being predicted through near-future prediction, it may be replaced with an expected future acceleration value predicted by the acceleration/deceleration prediction unit. Thereby, the second threshold value may also be set to an acceleration value instead of the required torque. As a result, when the current required torque is greater than or equal to the first threshold value and the predicted acceleration at a near-future point of time is greater than or equal to the second threshold value represented by an acceleration, downshifting may be performed, and if not, the current speed stage may be maintained.

The present disclosure described above may be implemented as a computer-readable code on a medium on which a program is recorded. The computer-readable medium includes all kinds of recording devices in which data that may be read by a computer system is stored. Examples of the computer-readable medium include a hard disk drive (HDD), a solid state drive (SSD), a silicon disk drive (SDD), a ROM, a RAM, a CD-ROM, a magnetic tape, a floppy disk, and an optical data storage device.

As apparent from the above description, the present disclosure has effects as follows.

A hybrid vehicle related to at least one form of the present disclosure configured as described above may more efficiently control the mode transition.

Particularly, non-driving fuel loss may be reduced because whether or not and when to perform a mode transition are determined through prediction of a near-future required torque and a motor speed using machine learning scheme.

It will be appreciated by those skilled in the art that the effects that can be achieved with the present disclosure are not limited to what has been described above and other effects of the present disclosure will be clearly understood from the following detailed description taken in conjunction with the accompanying drawings.

It will be apparent to those skilled in the art that various modifications and variations can be made in the present disclosure without departing from the spirit or scope of the present disclosures. Thus, it is intended that the present disclosure cover the modifications and variations of this present disclosure provided they come within the scope of the present disclosure.

What is claimed is:

1. A method of controlling a mode transition of a hybrid vehicle, the method comprising:
   determining, by a hybrid control unit, whether to change an electric vehicle (EV) mode to a hybrid electric vehicle (HEV) mode based on a first torque, the first torque being a current required torque calculated based on an input from a driver at a current time;
   determining, by the hybrid control unit, a second torque to be generated at a predetermined near-future time, wherein the predetermined near-future time is set by adding a predetermined time to the current time;
   determining, by the hybrid control unit, whether or not an engine clutch engagement is possible at the predetermined near-future time based on the second torque; and
   performing, by the hybrid control unit, the change from the EV mode to the HEV mode when the change from the EV mode to the HEV mode is determined and the engine clutch engagement is possible,
   wherein the determining of the second torque comprises:
      determining, by a driver acceleration and deceleration prediction unit configured to perform an acceleration and deceleration prediction model, a predicted value of an acceleration intention and a deceleration intention of a driver based on at least one of driver propensity information, advanced driver assistance system (ADAS) information, or navigation information; and
      determining, by the hybrid control unit, the second torque based on the predicted value of the acceleration intention or the deceleration intention.

2. The method according to claim 1, further comprising:
   maintaining, by the hybrid control unit, the EV mode when the change from the EV mode to the HEV mode is not required or when the engine clutch engagement is predicted to be failed at the predetermined near-future time.

3. The method according to claim 1, further comprising:
   determining, by at least one position sensor, positions of an accelerator pedal and a brake pedal; and
   determining, by the hybrid control unit, the first torque using the determined positions.

4. The method according to claim 1, wherein the acceleration and deceleration prediction model is modified through a machine learning-based scheme.

5. The method according to claim 1, wherein the predicted value of the acceleration intention and the deceleration intention comprises position information of an accelerator pedal and a brake pedal at the predetermined near-future time.

6. The method according to claim 1, wherein the step of determining whether the engine clutch engagement is possible comprises:
   determining a predicted motor speed at the predetermined near-future time based on the second torque; and
   determining that the engine clutch engagement is possible when the predicted motor speed is faster than a target engagement speed.

7. The method according to claim 6, wherein the step of performing the change from the EV mode to the HEV mode comprises starting an engine so that an engine speed reaches the predicted motor speed at the predetermined near-future time at which the predicted motor speed becomes faster than the target engagement speed.

8. The method according to claim 2, wherein the engine clutch is disposed between an engine and an electric motor.

9. A non-transitory computer-readable recording medium configured to store a program for carrying out the method according to claim 1.

10. A hybrid vehicle comprising:
    a driving information detection unit configured to interoperate with various sensors of the hybrid vehicle and configured to detect driving information of the hybrid vehicle;
    a driver acceleration and deceleration prediction unit configured to generate a predicted value of a near-future acceleration intention and a near-future deceleration intention of a driver at a predetermined near-future time based on a driving environment of the hybrid vehicle, and information transmitted from the driving information detection unit by utilizing an acceleration and deceleration prediction model, wherein the predetermined near-future is set by adding a predetermined time to a current time; and
    a hybrid control unit configured to:
       determine a first torque based on an input from a driver at the current time, and
       determine a second torque based on the predicted value of the near-future acceleration or deceleration intention,
    wherein the first torque is a current required torque at the current time, and the second torque is a required torque expected to be generated at the predetermined near-future time, and
    wherein the hybrid control unit is further configured to:
       determine whether to change an EV mode to a HEV mode based on the first torque,
       determine whether or not an engine clutch engagement is possible at the predetermined near-future time based on the second torque; and
       perform the change from the EV mode to the HEV mode when the change from the EV mode to the HEV mode is determined and the engine clutch engagement is possible,
       determine the predicted value of the acceleration and deceleration intentions of the driver using the acceleration and deceleration prediction model inputted with at least one of driver propensity information, advanced driver assistance system (ADAS) information, or navigation information, and
       determine the second torque based on the predicted value of the acceleration or deceleration intention.

11. The hybrid vehicle according to claim 10, wherein the hybrid control unit is further configured to maintain the EV mode when the change from the EV mode to the HEV mode is not required or when the engine clutch engagement is predicted to be failed at the predetermined near-future time.

12. The hybrid vehicle according to claim 10, wherein the hybrid control unit is further configured to:
    determine positions of an accelerator pedal and a brake pedal, and
    determine the first torque based on the determined positions.

13. The hybrid vehicle according to claim 10, wherein the acceleration and deceleration prediction model is persistently modified through a machine learning-based scheme.

14. The hybrid vehicle according to claim 10, wherein the predicted value of the acceleration and deceleration intentions comprises position information on an accelerator pedal and a brake pedal at the predetermined near-future time.

15. The hybrid vehicle according to claim 10, wherein the hybrid control unit is further configured to:
  determine a predicted motor speed at the predetermined near-future time based on the second torque, and
  determine that the engine clutch engagement is possible when the predicted motor speed is faster than a target engagement speed.

16. The hybrid vehicle according to claim 15, wherein the hybrid control unit is further configured to start an engine so that an engine speed reaches the predicted motor speed at the predetermined near-future time at which the predicted motor speed become faster than the target engagement speed.

17. The hybrid vehicle according to claim 11, wherein the engine clutch is disposed between an engine and an electric motor.

* * * * *